United States Patent
Mam et al.

(10) Patent No.: US 11,243,850 B2
(45) Date of Patent: *Feb. 8, 2022

(54) IMAGE RECOVERY FROM VOLUME IMAGE FILES

(71) Applicant: EMC IP Holding Company LLC, Hopkinton, MA (US)

(72) Inventors: Neelabh Mam, Bangalore (IN); Vladimir Mandic, San Jose, CA (US); Ravi Shankar, Guntur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/543,848

(22) Filed: Aug. 19, 2019

(65) Prior Publication Data

US 2019/0370127 A1 Dec. 5, 2019

Related U.S. Application Data

(63) Continuation of application No. 15/136,425, filed on Apr. 22, 2016, now Pat. No. 10,430,294, which is a continuation of application No. 14/138,563, filed on Dec. 23, 2013, now Pat. No. 9,348,703.

(51) Int. Cl.
*G06F 11/14* (2006.01)
*G06F 16/11* (2019.01)
*G06F 16/182* (2019.01)

(52) U.S. Cl.
CPC ...... *G06F 11/1469* (2013.01); *G06F 11/1446* (2013.01); *G06F 11/1451* (2013.01); *G06F 11/1464* (2013.01); *G06F 11/1471* (2013.01);
*G06F 16/128* (2019.01); *G06F 16/182* (2019.01); *G06F 2201/80* (2013.01); *G06F 2201/835* (2013.01)

(58) Field of Classification Search
None
See application file for complete search history.

(56) References Cited

U.S. PATENT DOCUMENTS

| | | | |
|---|---|---|---|
| 5,089,958 A | 2/1992 | Horton | |
| 5,765,173 A * | 6/1998 | Cane | G06F 11/1453 707/640 |
| 7,251,749 B1 | 7/2007 | Fong | |
| 7,412,583 B2 | 8/2008 | Burton | |
| 7,934,064 B1 | 4/2011 | Per | |
| 8,041,679 B1 | 10/2011 | Narayanan | |
| 8,170,991 B1 | 5/2012 | Dhakras | |
| 8,200,637 B1 | 6/2012 | Stringham | |
| 8,315,983 B1 | 11/2012 | Sumant | |
| 8,615,495 B1 | 12/2013 | Payne | |
| 8,621,165 B1 | 12/2013 | Sridharan | |
| 8,918,606 B1 * | 12/2014 | Stringham | G06F 11/1469 711/162 |
| 9,098,452 B2 | 8/2015 | Atzmon | |

(Continued)

*Primary Examiner* — Uyen T Le
(74) *Attorney, Agent, or Firm* — Krishnendu Gupta; Nikhil Patel

(57) ABSTRACT

A system for image recovery comprises an input interface and a processor. The input interface is configured to receive a block backup volume that can be mounted. The processor is configured to determine a merged chain map by consolidating one or more incremental chain maps and to store an image using the merged chain map and a volume map.

26 Claims, 5 Drawing Sheets

(56) References Cited

U.S. PATENT DOCUMENTS

| | | |
|---|---|---|
| 10,140,051 B1 | 11/2018 | Sun |
| 2003/0204516 A1 | 10/2003 | Klosterhalfen |
| 2005/0182910 A1* | 8/2005 | Stager ................. G06F 11/1471 |
| | | 711/162 |
| 2007/0220321 A1 | 9/2007 | Iqbal |
| 2010/0114828 A1 | 5/2010 | Persson |
| 2013/0159646 A1 | 6/2013 | Atzmon |
| 2013/0173548 A1* | 7/2013 | Haustein ............. G06F 16/1873 |
| | | 707/638 |
| 2014/0052700 A1* | 2/2014 | VanderSpek ........ G06F 16/1756 |
| | | 707/693 |
| 2014/0149354 A1 | 5/2014 | Chan |

* cited by examiner

IMAGE RECOVERY FROM VOLUME IMAGE FILES

CROSS REFERENCE TO OTHER APPLICATIONS

This application is a continuation of U.S. patent application Ser. No. 15/136,425, entitled IMAGE RECOVERY FROM VOLUME IMAGE FILES filed Apr. 22, 2016 which is incorporated herein by reference for all purposes, which is a continuation of U.S. patent application Ser. No. 14/138,563, entitled IMAGE RECOVERY FROM VOLUME IMAGE FILES filed Dec. 23, 2013, now U.S. Pat. No. 9,348,703, which is incorporated herein by reference for all purposes.

BACKGROUND OF THE INVENTION

File-level backup applications copy data from the source volume to backup server on a file-by-file basis, regardless of where the data for the file is physically located on the original volume. This means that the backup application attempts to build and replicate the original volume's file data by reading the logical file system present on it. Block based backup applications, on the other hand, bypass the file system and read volume data directly from the disk or volume. The advantage of bypassing the file system is that there is no penalty on backup performance if the underlying disk or volume has large number of files. Block level backups implicitly preserve the file system layout of the original source volume in the backed-up image, which eliminates the need to generate and manage file indexes for granular recovery.

Disaster recovery from image level backup typically involves mounting the backup on the host where disaster recovery has to be performed and then reading the mounted volume's logical device object. The data is then sequentially written on to the raw target physical disk. However, if the backup image is stored in a format that is not directly mountable, recovering all of the image data is neither simple nor efficient.

BRIEF DESCRIPTION OF THE DRAWINGS

Various embodiments of the invention are disclosed in the following detailed description and the accompanying drawings.

DETAILED DESCRIPTION

Figure 1:
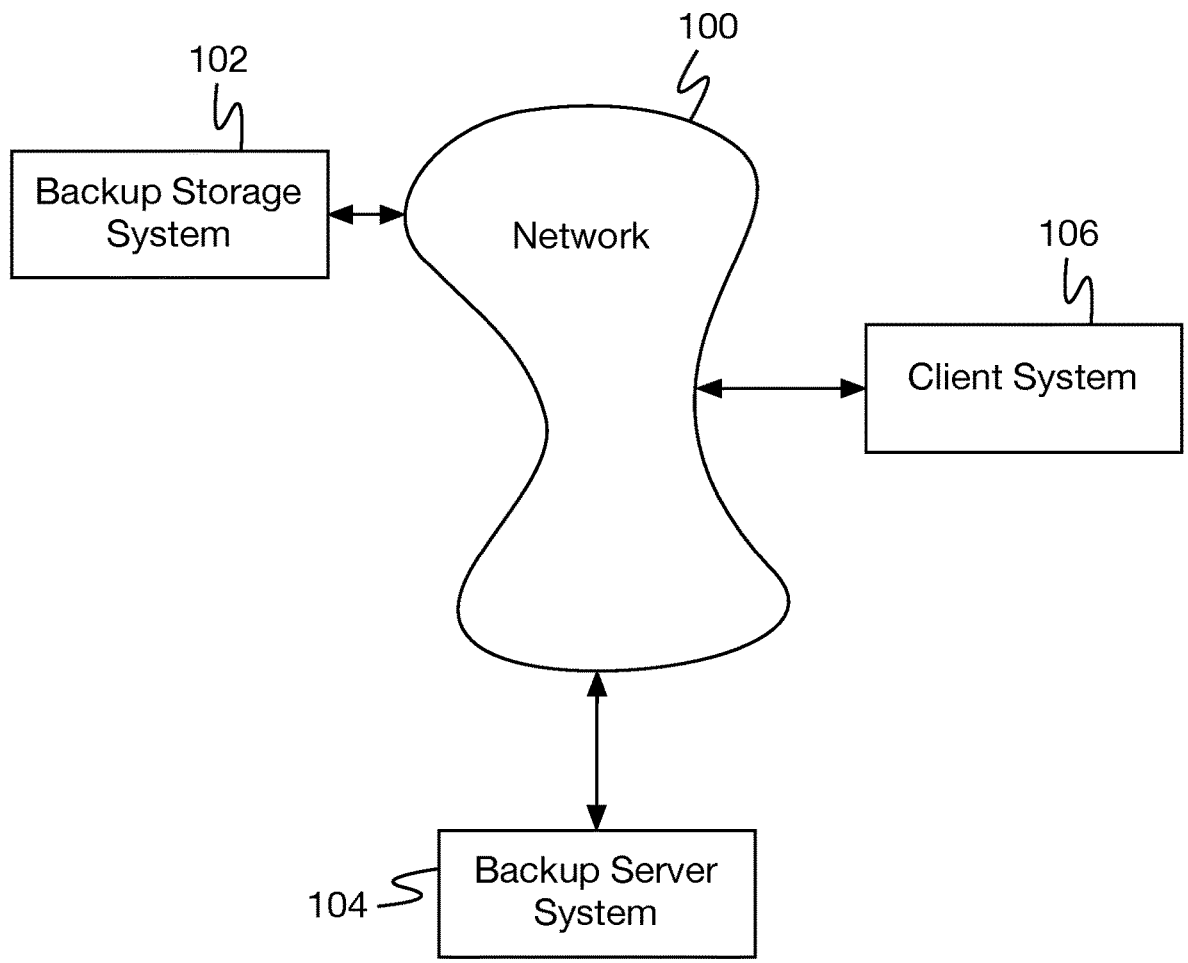
FIG. 1 is a block diagram illustrating an embodiment of a system for image recovery from volume image files.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Image recovery from volume image files is disclosed. A system for image recovery comprises an input interface and a processor. The input interface is configured to receive a block backup volume that can be mounted. The processor is configured to determine a merged chain map by consolidating one or more incremental chain maps and to store an image using the merged chain map and a volume map. The system for image recovery additionally comprises a memory coupled to the processor and configured to provide the processor with instructions.

In some embodiments, image recovery from volume image files comprises efficiently reading a volume image file that includes a chain maps that indicate up-to-date versions of blocks of the volume and volume maps that indicate compressed blocks of the volume. The volume image file comprises a block based backup volume, which includes a full backup (e.g., a complete backup of the originating system) and any number of incremental backups (e.g., backups comprising only data that has changed since the previous backup). Each incremental backup is associated with a chain map (e.g., a map indicating the locations within the originating system of the changed data stored within the incremental backup). The block based backup volume additionally comprises a volume map comprising metadata describing sparse data (e.g., locations and sizes of empty regions within the originating system with sparse data—for example, all zero blocks are indicated). The block based backup volume additionally comprises a header and a tail section allowing the block based backup volume to appear as a mountable file. In some embodiments, the backup storage system storing the block based backup volume does not store the block based backup volume as a contiguous file or as a readable file. Mounting the block based backup volume then requires reading out every block of the block based backup volume into a storage system (e.g., an administrator storage system), assembling the blocks into a contiguous file, and mounting the file. Disaster recovery from this file can be performed by first copying the full backup to a target volume image, and then copying changes stored in the incremental backups. Finally the volume map is used to expand sparse data regions. This method is very inefficient, however.

In some embodiments, an efficient method to perform volume image recovery does not read out the entire block based backup volume from the backup storage system. In some embodiments, the process begins by reading or processing the set of chain maps from the block based backup volume. For example, processing the set of chain maps from oldest to newest, from newest to oldest, or any other appropriate sequence for processing. The set of chain maps is merged to form a merged chain map. The merged chain map comprises the location (e.g., which incremental or full backup) of the most recent version of the data stored at each block address in the volume image. The volume image is then recovered by copying the block from the backup indicated by the merged chain map for each block address. Only the required blocks are read from the backup storage system. In contrast, each incremental backup could have been sequentially applied to the full backup to recreate an up-to-date version of the volume, but this would have inefficiently written over each block that has changed for each incremental backup. In some embodiments, after data block is copied for each block address in the volume, the volume map is used to expand sparse data regions.

FIG. 1 is a block diagram illustrating an embodiment of a system for image recovery from volume image files. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, client system 106 comprises a client system (e.g., a computing system for operation by a user). In some embodiments, client system 106 comprises a system accessed by a user directly (e.g., the user is in proximity with client system 106). In some embodiments, client system 106 comprises a system accessed by a user remotely (e.g., the user is not in proximity with client system 106, and accesses client system 106 via network 100 and a separate user system). Client system 106 comprises a system running enterprise software (e.g., business software for creating data, storing data, transmitting data, receiving data, etc.). In some embodiments, client system 106 comprises a system for storing data on a backup system or retrieving stored data from a backup system. In various embodiments, there are 1, 4, 17, 22, 1459, or any other appropriate number of client systems communicating with network 100. Backup storage system 102 comprises a computer system for backing up data. Backup system 102 backs up data stored on client system 106. In various embodiments, backup system 102 performs full backups of the data on client system 106 (e.g., makes complete copies of the data), performs incremental backups of the data on client system 106 (e.g., makes copies of data modified since the last backup), performs a combination of full and incremental backups of the data on client system 106, or performs any other appropriate kind of backup. In some embodiments, data stored on backup system 102 comprises deduplicated backup data (e.g., data is stored in such a way that multiple copies of the same data are only stored a single time). In some embodiments, deduplicated backup data is segmented (e.g., broken into chunks which can then be compared to determine duplicate data). In some embodiments, deduplicated backup data is segmented using a hash function (e.g., a hash function is used to determine where to divide data into segments). In various embodiments, there are 1, 2, 7, 12, 45, 138, or any other appropriate number of backup storage systems communicating with network 100. Backup server system 104 comprises a server system for controlling backup storage system 102 and client system 106.

Figure 2:
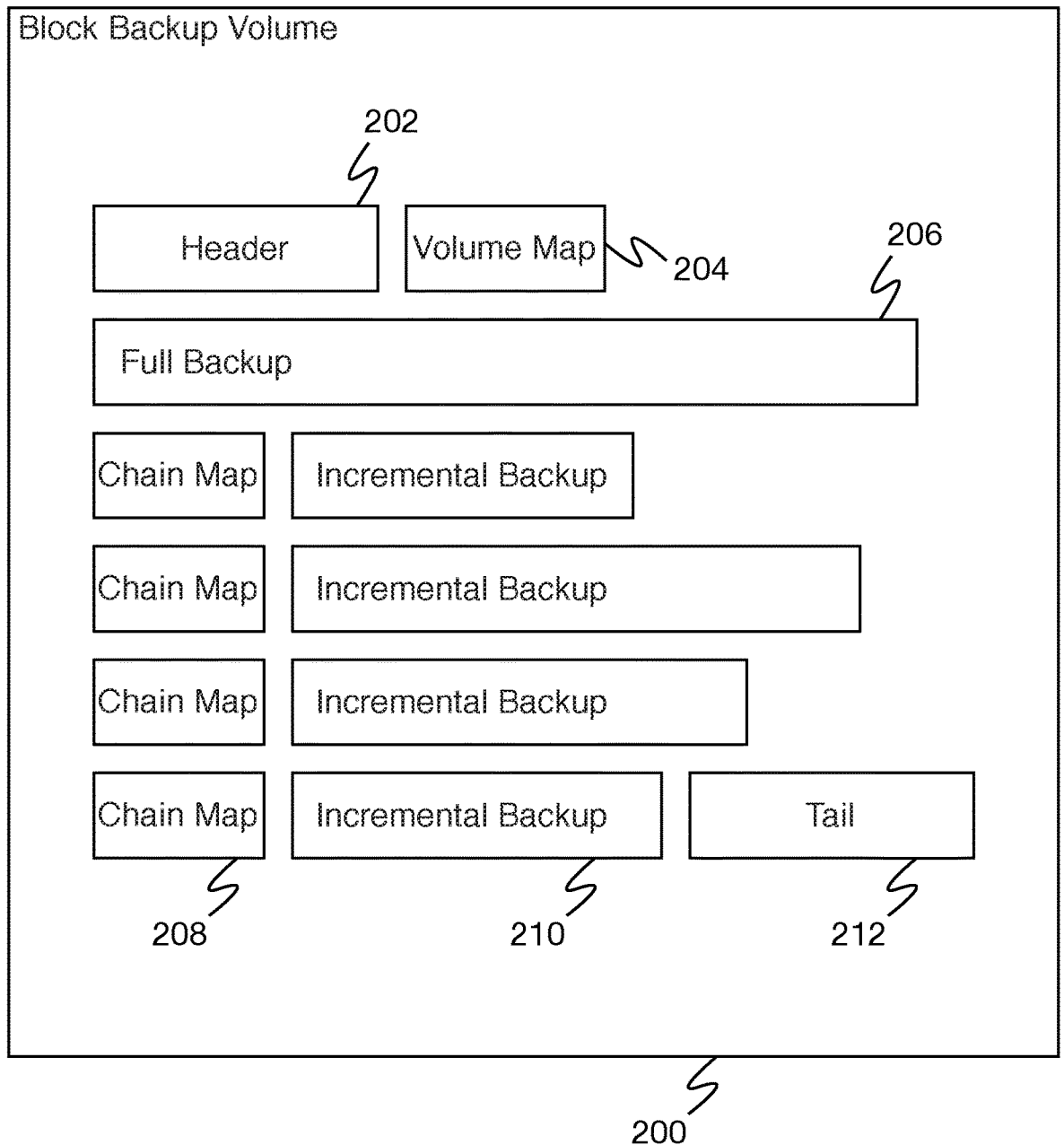
FIG. 2 is a block diagram illustrating an embodiment of a block backup volume.

FIG. 2 is a block diagram illustrating an embodiment of a block backup volume. In some embodiments, block backup volume 200 comprises a backup volume of storage on a client system (e.g., client system 106 of FIG. 1). In some embodiments, block backup volume 200 is stored on a backup storage system. In the example shown, block backup volume 200 is stored on a block based backup storage system. Block backup volume 200 comprises a set of backups (e.g., full backup 206 and any appropriate number of incremental backups such as increment backup 210). A full backup comprises a complete backup of an originating client system volume. An incremental backup comprises a backup of changes to the originating client system volume since the last backup. Block backup volume 200 stores a chain map (e.g., chain map 206) associated with each incremental backup (e.g., incremental backup 210). The chain map comprises metadata describing the locations (e.g., locations within full backup 206) that data in the associated incremental backup supersedes. Block backup volume 200 additionally comprises volume map 204. Volume map 204 comprises sparse file metadata (e.g., metadata describing the location and size of empty data blocks). In some embodiments, block backup volume 200 additionally comprises header 202 and tail 212. In some embodiments, header 202 and tail 212 comprises data chunks allowing block backup volume 200 to appear as a mountable file (e.g., a file that can be mounted as a data volume on a system). In some embodiments, each incremental backup includes storing a chain map and a volume map for that incremental backup as part of the incremental backup data.

In some embodiments, a block based backup storage system reads data from the originating client system as a set of data blocks (e.g., fixed size data chunks, much smaller than a typical file size). In some embodiments, the block based storage system storing block backup volume 200 does not store the blocks contiguously. In some embodiments, a file stored within block backup volume 200 can be read by reading all blocks comprising block backup volume 200 from the block based backup storage system, assembling the blocks into a single file, mounting the file, and reading a file from the resulting mounted volume. In some embodiments, a file stored within block backup volume 200 can be read directly if its address within backup volume 200 is known. In some embodiments, a file from the originating client system can be read by reading the version of the file stored in full backup 206 (e.g., from a mounted block backup volume), checking each chain map to see if a modification to the file is indicated in the chain map (e.g., chain map 208), and if a modification is indicated in the chain map, reading the modification from the associated incremental backup (e.g., incremental backup 210) and applying the modification to the file.

In some embodiments, in the event that disaster recovery is required (e.g., the entire client system is lost and must be recovered from the backup system) full backup 206 is copied from the mounted block backup volume to the target for recovery and modified with data from each incremental backup (e.g., incremental backup 210) using each associated chain map (e.g., chain map 208) to indicate the data locations so that each block is efficiently copied over to a target volume. For example, each block in the target volume is copied from an appropriate location in the backup volume file only once from its appropriate up-to-date version on the backup volume as indicated by the merged chain map.

Figure 3:
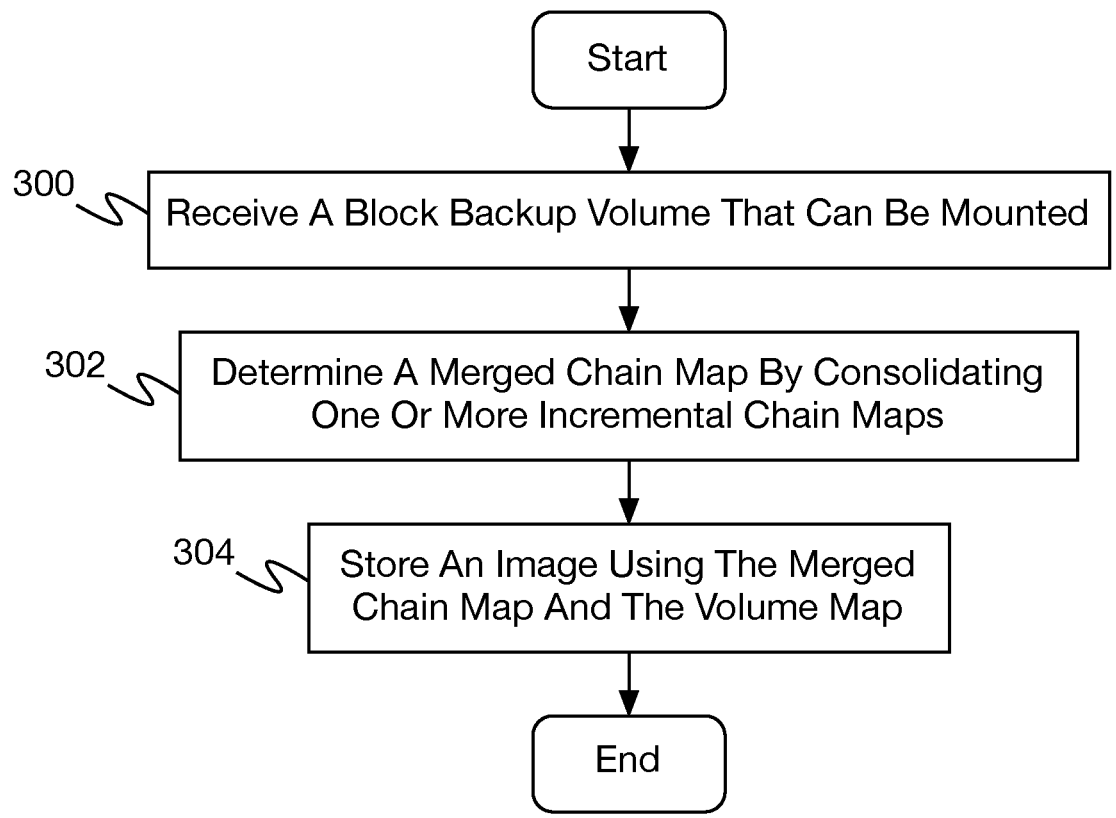
FIG. 3 is a flow diagram illustrating an embodiment of a process for image recovery.

FIG. 3 is a flow diagram illustrating an embodiment of a process for image recovery. In some embodiments, the process of FIG. 3 is used by a backup server system (e.g., backup server system 104 of FIG. 1) for recovering a block backup volume. In the example shown, in 300, a block backup volume that can be mounted is received. In some embodiments, the block backup volume comprises block backup volume 200 of FIG. 2. In some embodiments, the block backup volume is stored on a backup storage system. In some embodiments, receiving a block backup volume comprises receiving an address of a block backup volume (e.g., an indication of how to access a block backup volume stored on a backup storage system). In 302, a merged chain map is determined by consolidating one or more incremental chain maps. In some embodiments, determining a merged chain map comprises accessing chain maps (e.g., chain maps stored as part of the block backup volume) and merging the chain maps to form a single chain map indicating the backup containing the most recent version of each data block in the block backup volume. In some embodiments, the merged chain map is stored (e.g., in a memory, on a disk, in a storage location, etc.) and used for copying blocks from the backup volume file to a target volume. In some embodiments, the merged chain map is discarded (e.g., deleted) after the target volume is written and the disaster recovery of the backup volume is complete. In 304, an image is stored using the merged chain map and the volume map. In some embodiments, storing an image comprises using the merged chain map and the backup files stored in the block backup volume to determine the most recent data for each data block in the block backup volume. In some embodiments, storing an image comprises using the volume map to decompress sparse files.

Figure 4:
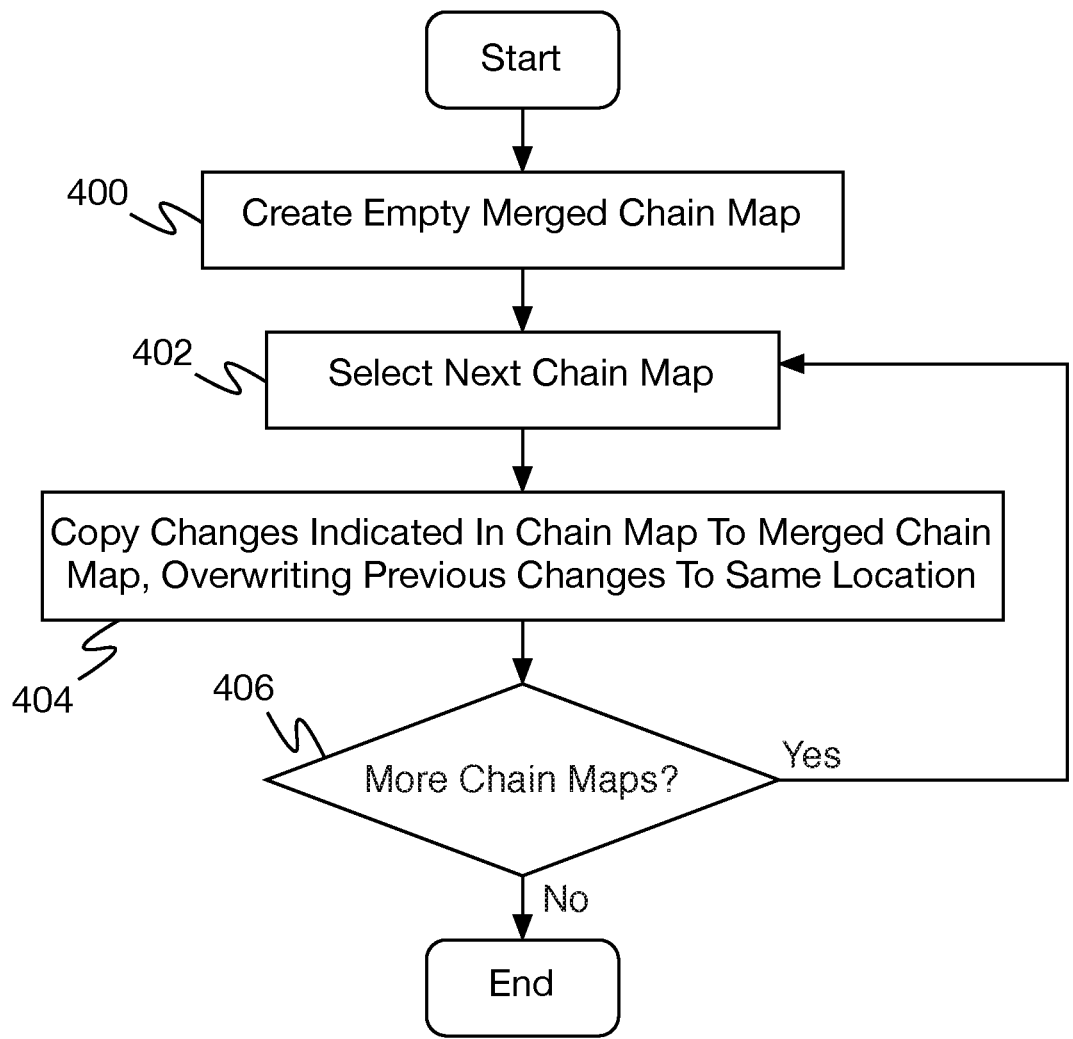
FIG. 4 is a flow diagram illustrating an embodiment of a process for determining a merged chain map by consolidating one or more incremental chain maps.

FIG. 4 is a flow diagram illustrating an embodiment of a process for determining a merged chain map by consolidating one or more incremental chain maps. In some embodiments, the process of FIG. 4 implements 302 of FIG. 3. In the example shown, an empty merged chain map is created. For example, the empty map is stored in a memory, a disk location, etc. In 402, the next chain map is selected (e.g., the next chain map stored in a block backup volume, e.g., block backup volume 200 of FIG. 2). In some embodiments, the next chain map comprises the first chain map. In 404, the changes indicated in the chain map are copied to the merged chain map, overwriting previous changes to the same location. In some embodiments, copying changes indicated in the chain map to the merged chain map comprises copying indications that a data block in an incremental backup supersedes previous backups to the merged chain map. In 406, it is determined whether there are more chain maps. If it is determined in 406 that there are more chain maps, control passes to 402. If it is determined in 406 that there are not more chain maps, the process ends.

In some embodiments, the merged chain map is determined by processing the chain maps associated with the incremental backups backwards. For example, for a selected chain map (where the chain maps are selected in order from most recent to oldest), it is determined whether each block in the selected chain map has been previously placed in the merged chain map. In the event that a given block has been previously placed in the merged chain map, the most up-to-date block is already designated in the merged chain map and no action is required. In the event that the given block has not been previously placed in the merged chain map, the current chain map version (pointing to its associated incre-mentally backed up version of the block) is designated in the merged chain map. All blocks for the chain map are processed before moving on to the next chain map or the original full backup. When the original full backup is reached, all remaining blocks that have not yet been designated in the merged chain map as having been updated in a more recent incremental backup are designated as having their most recent stored version in the original full backup. In some embodiments, in the event that a merged chain map has no designation of an incremental block as the most up-to-date block, it is the same as a designation that the original full backup clock is the most up-to-date version of the block.

Figure 5:
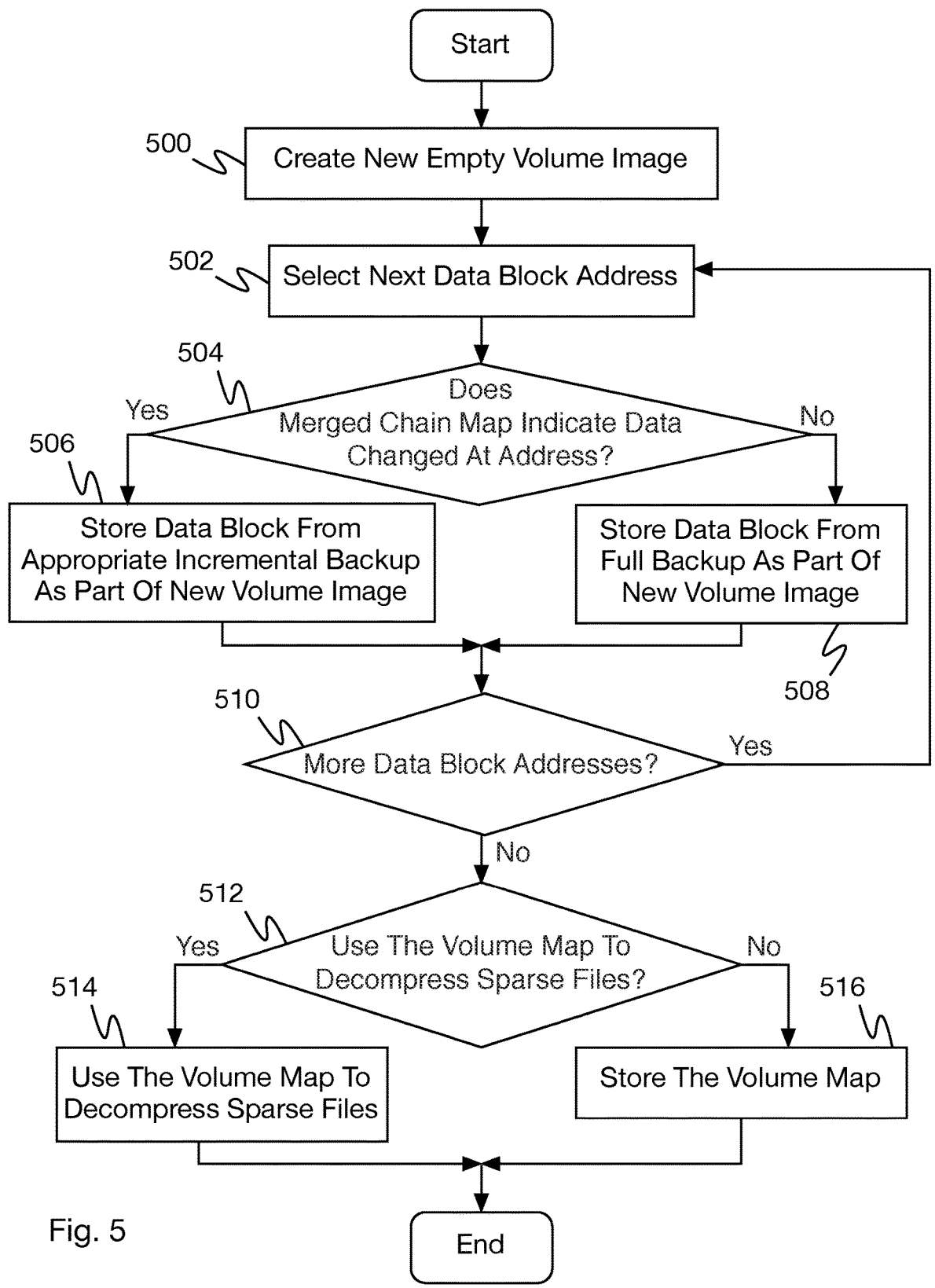
FIG. 5 is a flow diagram illustrating an embodiment of a process for storing an image using a merged chain map and a volume map.

FIG. 5 is a flow diagram illustrating an embodiment of a process for storing an image using a merged chain map and a volume map. In some embodiments, the process of FIG. 5 implements 304 of FIG. 3. In the example shown, in 500, a new empty volume image is created. In 502, the next data block address is selected. In some embodiments, the next data block address comprises the address of the next data block within the volume image being recovered. In some embodiments, the next data block address comprises the first data block address. In 504, it is determined whether the merged chain map indicates the data block has been changed at the address (e.g., at the address selected in 502). In some embodiments, determining whether the merged chain map indicates the data block has been changed at the address comprises determining whether the data block at the address has been changed since the last full backup. If it is determined in 504 that the data block at the address has been changed, control passes to 506. In 506, a data block from the appropriate incremental backup (e.g., an incremental backup as in incremental backup 210 of FIG. 2) is stored as part of the new volume image (e.g., the data block at the selected address from the appropriate incremental backup is copied to the new volume image at the selected address). The merged chain map indicates which incremental backup is the appropriate incremental backup. Control then passes to 510. If it is determined in 504 that the merged chain map does not indicated the data block has been changed, control passes to 508. In 508, a data block from the full backup (e.g., full backup 206 of FIG. 2) is stored as part of the new volume image (e.g., the data block at the selected address from the full backup is copied to the new volume image at the selected address). In 510, it is determined whether there are more data block addresses (e.g., there are more data block addresses if the data block address selected in 502 was not the last data block address). If it is determined in 510 that there are more data block addresses, control passes to 502. If it is determined in 510 that there are not more data block addresses, control passes to 512. In 512, it is determined whether the volume map should be used to decompress sparse files. In various embodiments, it is determined whether the volume map should be used to decompress sparse files by determining an available amount of space on a storage system (e.g., the storage system where the volume image is being stored), by querying a configuration file, by querying a user, or in any other appropriate way. If it is determined in 512 that the volume map should be used to decompress sparse files, control passes to 514. In 514, the volume map is used to decompress sparse files. In some embodiments, using the volume map to decompress sparse files comprises using the volume map to determine locations and sizes of groups of empty data and inserting the groups of empty data at the appropriate locations. The process then ends. If it is determined in 512 that the volume map should not be used to decompress sparse files, control passes to 516.

In 516, the volume map is stored (e.g., so it can be used to decompress sparse files at a later point).

In some embodiments, the process indicates that the merged chain map copying of the volume is complete. In some embodiments, the process indicates that the volume map decompression is complete. In some embodiments, the process indicates that the volume map has been stored in the new volume.

In some embodiments, performing image recovery from volume images comprises pulling volume level data embedded inside a container VHD(x) file (e.g., a virtual hard disk format x) and writing it on to a target physical disk without the indirection of a volume mount. Typically, when a VHD (x) is mounted on a windows host, the VHDMP (e.g., Virtual Hard Disk (VHD) Miniport Driver) acts at the function driver for the overlaying virtual disk by pulls disk level data in response to reads done against the virtual disk class device. Because of the way PnP device (e.g., a plug and play device) are enumerated on the windows, the act of exposing a virtual disk device triggers the PnP manager (e.g., Plug and Play manager) to build a logical volume device stack on top of the virtual disk exposed by vhdmp.sys miniport. The lower edge of vhdmp.sys pulls disk level data while the upper edge which the volmgr stack talks to, feeds volume level data. The volume level data is then read by the image recovery application which then writes it on to the physical volume. The user mode image parser routine can then pull the same volume level data embedded inside an overlaying disk container. With this in place, the dependency on vhdmp.sys for parsing the overlaying container is removed and with that the need to mount the image. This is helpful in scenarios where the backup image is present on servers from which vhdmp miniport cannot mount disk images (e.g., Data Domain Boost storage units).

In some embodiments, the performing image recovery from volume images comprises a method as exemplified by the pseudocode below:

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   an input interface configured to receive a block backup volume that can be mounted; and
   a processor configured to:
   determine a merged chain map by consolidating a plurality of chain maps, wherein to determine the merged chain map includes iteratively selecting one chain map of the plurality of chain maps, and for each block in the selected one chain map based at least in part on an order from most recent to oldest, placing the block in the merged chain map according to a determination of whether the merged chain map already comprises the block; and
   use the merged chain map in connection with recovery of a volume image file.

2. The system of claim 1, wherein the merged chain map comprises information indicating a location of a most recent version of data stored at each block address in the volume image file.

3. The system of claim 1, wherein the plurality of chain maps correspond to a plurality of incremental chain maps.

4. The system of claim 1, wherein the placing the block in the merged chain map according to a determination of whether the merged chain map already comprises the block comprises:
   determining whether the merged chain map already comprises the block;
   in response to determining that the merged chain map does not comprise the block, placing the block in the merged chain map; and
   in response to determining that the merged chain map comprises the block, skipping writing the block from the selected one chain map to the merged chain map.

5. The system of claim 1, wherein the recovery of the volume image file is further based at least in part on a most recent full backup.

6. The system of claim 1, wherein the plurality of chain maps correspond to a plurality of incremental chain maps and the merged chain map indicates the changes to the full backup that exist in the plurality of incremental chain maps before the changes are applied to the full backup in connection with a data recovery process.

7. The system of claim 1, wherein the plurality of chain maps correspond to a plurality of incremental chain maps, and the plurality of incremental chain maps correspond to one or more incremental backups.

8. The system of claim 1, wherein to recover the volume image file comprises storing the image using the merged chain map and the volume map and mounting the merged chain map and reading a file from the mounted merged chain map.

9. The system of claim 1, wherein the plurality of chain maps correspond to a plurality of incremental chain maps, and the block backup volume includes the plurality of incremental chain maps.

10. The system of claim 1, wherein the block backup volume includes a volume map, the volume map being used in connection with recovering the volume image file.

11. The system of claim 10, wherein the volume map comprises sparse file metadata.

12. The system of claim 1, wherein the block backup volume includes backup data.

13. The system of claim 12, wherein the backup data comprises the backup.

14. The system of claim 12, wherein the backup data comprises one or more incremental backups.

15. The system of claim 1, wherein the merged chain map is used to copy blocks from the block backup volume to a target volume.

16. The system of claim 1, wherein the plurality of chain maps correspond to a plurality of incremental chain maps, and to determine the merged chain map comprises consolidating the plurality of incremental chain maps by determining a set of up-to-date blocks indicated in the plurality of incremental chain maps and storing indicators to the set of up-to-date blocks in the merged chain map.

17. The system of claim 1, wherein to recover the volume image file comprises storing an image using the merged chain map and a volume map, the storing the image comprising retrieving and storing the set of up-to-date blocks.

18. The system of claim 17, wherein each block in the set of up-to-date blocks comprises a most recent stored version of a data block from an appropriate stored full or incremental backup.

19. The system of claim 18, wherein the appropriate stored full or incremental backup is determined using the merged chain map.

20. The system of claim 17, wherein in response to determining that the merged chain map indicates that the data is not changed at an address, a data block is stored at the address in the image from a full backup.

21. The system of claim 1, wherein the plurality of chain maps correspond to a plurality of incremental chain maps, and to determine the merged chain map comprises:
create the merged chain map, wherein the merged chain map is created as a merged empty chain map; and
copy changes indicated in the plurality of incremental chain maps to the empty merged chain map to form the merged chain map.

22. The system of claim 21, wherein to copy changes indicated in the plurality of incremental chain maps to the empty merged chain map comprises:
copy the changes indicated in the plurality of incremental chain maps to corresponding blocks of the merged chain map.

23. The system of claim 1, wherein an empty block of the merged chain map is indicative that a most up-to-date information for the block is represented in the full backup.

24. The system of claim 1, wherein the plurality of chain maps correspond to a plurality of incremental chain maps, and a determination that the merged chain map already comprises the block is indicative of the merged chain map comprising more recent data from another one of the plurality of incremental chain maps.

25. A computer program product, the computer program product being embodied in a non-transitory computer readable storage medium and comprising computer instructions for:
receiving a block backup volume that can be mounted;
determining a merged chain map by consolidating a plurality of chain maps, wherein determining the merged chain map includes iteratively selecting one chain map of the plurality of chain maps a merged chain map by consolidating a plurality of chain maps, wherein to determine the merged chain map includes iteratively selecting one chain map of the plurality of chain maps, and for each block in the selected one chain map based at least in part on an order from most recent to oldest, placing the block in the merged chain map according to a determination of whether the merged chain map already comprises the block, and for each block in the selected one chain map, placing the block in the merged chain map according to a determination of whether the merged chain map already comprises the block; and
using the merged chain map in connection with recovery of a volume image file.

26. A method, comprising:
receiving a block backup volume that can be mounted;
determining, using a processor, a merged chain map by consolidating a plurality of chain maps, wherein determining the merged chain map includes iteratively selecting one chain map of the plurality of chain maps a merged chain map by consolidating a plurality of chain maps, wherein to determine the merged chain map includes iteratively selecting one chain map of the plurality of chain maps, and for each block in the selected one chain map based at least in part on an order from most recent to oldest, placing the block in the merged chain map according to a determination of whether the merged chain map already comprises the block, and for each block in the selected one chain map, placing the block in the merged chain map according to a determination of whether the merged chain map already comprises the block; and
using the merged chain map in connection with recovery of a volume image file.

* * * * *